(12) United States Patent
Lee et al.

(10) Patent No.: US 10,474,272 B2
(45) Date of Patent: Nov. 12, 2019

(54) DISPLAY DEVICE

(71) Applicant: Samsung Display Co., Ltd., Yongin-si, Gyeonggi-do (KR)

(72) Inventors: Hye Sog Lee, Osan-si (KR); Hyo Sun Kim, Seongnam-si (KR); Won-Ki Hong, Suwon-si (KR)

(73) Assignee: Samsung Display Co., Ltd. (KR)

( * ) Notice: Subject to any disclaimer, the term of this patent is extended or adjusted under 35 U.S.C. 154(b) by 220 days.

(21) Appl. No.: 15/413,172

(22) Filed: Jan. 23, 2017

(65) Prior Publication Data

US 2017/0371469 A1 Dec. 28, 2017

(30) Foreign Application Priority Data

Jun. 28, 2016 (KR) .......................... 10-2016-0080995

(51) Int. Cl.
*G06F 3/041* (2006.01)
*G06F 3/044* (2006.01)

(52) U.S. Cl.
CPC ............ *G06F 3/0414* (2013.01); *G06F 3/044* (2013.01); *G06F 2203/04105* (2013.01); *G06F 2203/04106* (2013.01); *G06F 2203/04111* (2013.01)

(58) Field of Classification Search
CPC ............... G06F 3/0414; G06F 3/044; G06F 2203/04106; G06F 2203/04105; G06F 2203/04111
USPC ...... 73/866.3, 865.7, 862.042, 862.541, 714; 345/156, 173–178
See application file for complete search history.

(56) References Cited

U.S. PATENT DOCUMENTS

| | | | |
|---|---|---|---|
| 7,154,481 B2 | 12/2006 | Cross et al. | |
| 8,633,916 B2 | 1/2014 | Bernstein et al. | |
| 9,501,195 B1* | 11/2016 | Kim | G02F 1/13338 |
| 2009/0002199 A1 | 1/2009 | Lainonen et al. | |
| 2009/0256812 A1* | 10/2009 | Ha | G06F 3/041 |
| | | | 345/173 |
| 2010/0053087 A1 | 3/2010 | Dai et al. | |
| 2010/0225604 A1* | 9/2010 | Homma | G06F 3/0414 |
| | | | 345/173 |
| 2010/0328074 A1* | 12/2010 | Johnson | G06F 21/31 |
| | | | 340/573.1 |
| 2012/0147052 A1* | 6/2012 | Homma | G06F 3/044 |
| | | | 345/660 |
| 2012/0192121 A1* | 7/2012 | Bonnat | G06F 3/0488 |
| | | | 715/863 |
| 2012/0245741 A1* | 9/2012 | Ikushima | G06F 1/169 |
| | | | 700/282 |
| 2013/0257817 A1* | 10/2013 | Yliaho | G06F 3/0414 |
| | | | 345/177 |
| 2013/0321643 A1* | 12/2013 | Fujinawa | H04N 7/183 |
| | | | 348/169 |

(Continued)

FOREIGN PATENT DOCUMENTS

JP 2012198780 * 10/2002
KR 10-2006-0072529 A 6/2006

(Continued)

*Primary Examiner* — Robert R Raevis
(74) *Attorney, Agent, or Firm* — Innovation Counsel LLP

(57) ABSTRACT

A display device according to an exemplary embodiment includes a display panel displaying an image, and a sensor unit positioned on the display panel and configured to sense a pressure caused by a gas as an input signal.

26 Claims, 19 Drawing Sheets

(56) References Cited

U.S. PATENT DOCUMENTS

| | | | |
|---|---|---|---|
| 2014/0184628 A1* | 7/2014 | Lee | G06F 3/1423 345/545 |
| 2017/0269753 A1* | 9/2017 | Zhang | G06F 3/0414 |
| 2017/0311039 A1* | 10/2017 | Zuo | H04N 21/2668 |

FOREIGN PATENT DOCUMENTS

| | | |
|---|---|---|
| KR | 10-2010-0036739 A | 4/2010 |
| KR | 10-2014-0080500 A | 6/2014 |
| KR | 10-1473040 B1 | 12/2014 |
| WO | 2013/043847 A1 | 3/2013 |

\* cited by examiner

DISPLAY DEVICE

CROSS-REFERENCE TO RELATED APPLICATION

This application claims priority to and the benefit of Korean Patent Application No. 10-2016-0080995 filed in the Korean Intellectual Property Office on Jun. 28, 2016, the entire contents of which are incorporated herein by reference.

BACKGROUND

1. Technical Field

The present disclosure relates to a display device.

2. Description of the Related Art

Electronic devices such as a liquid crystal display (LCD), an organic light emitting diode (OLED) display, and an electrophoretic display may include a touch sensing function for enabling interaction with a user. A touch sensing function is used to obtain touch information, such as whether an object approaches or contacts a touch screen and a touch position by sensing a change in pressure, charges, light, etc. that are applied onto the screen of a display device, when a user writes text or draws a figure by approaching or touching the screen using a finger or a touch pen.

Such touch sensing functions of the various electronic devices can be realized by a touch sensor. The touch sensor can be classified into various types such as a resistive type, a capacitive type, an electromagnetic (EM) type, an optical type, etc.

Such a touch sensor may transmit contact information to the display device when the contact of an external object such as a finger of the user is detected. However, in a situation in which the external object such as the finger may not be used, there is a problem that the input signal may not be transmitted to the display device.

The above information disclosed in this Background section is only for enhancement of understanding of the background of the invention, and therefore, it may contain information that does not form the prior art that is already known in this country to a person of ordinary skill in the art.

SUMMARY

The present invention provides a display device transmitting an input signal without usage of an external object such as a finger of a user by providing a separate sensor as well as a touch sensor.

A display device according to an exemplary embodiment includes a display panel configured to display an image, and a sensor unit positioned on the display panel and configured to sense a pressure caused by a gas as an input signal.

The sensor unit may include a first sensor positioned on the display panel and may be configured to sense a contact, and a second sensor positioned on the first sensor and may be configured to sense the pressure caused by the gas to transmit a contact signal to the first sensor.

The second sensor may be separable from the first sensor.

A window disposed between the first sensor and the second sensor may be further included.

The second sensor may include a plurality of pressure receiving units.

The plurality of pressure receiving units may be arranged in a lattice shape.

The plurality of pressure receiving units may respectively include: a first supporting plate; a first vibration plate disposed to be separated from the first supporting plate; and a first spacer disposed between the first supporting plate and the first vibration plate.

The first supporting plate and the first vibration plate may be made of a transparent material.

First vibration plates respectively disposed in a plurality of pressure receiving units may be integrally formed.

First vibration plates respectively disposed in a plurality of pressure receiving units may be separated from each other.

The first vibration plate may be configured to bend to a side of the first supporting plate in response to an inflowing gas.

The first vibration plate may be made of a chargeable material.

The plurality of pressure receiving units may respectively include: a second supporting plate; an electrode plate disposed to be separated from the second supporting plate and formed with a plurality of first openings; and a second vibration plate disposed between the second supporting plate and the electrode plate and separated from the second supporting plate and the electrode plate.

The second supporting plate, the electrode plate, and the second vibration plate may be made of a transparent material.

The pressure receiving unit may further include a protection plate coupled to at least one of an upper surface and a lower surface of the electrode plate, and the protection plate may be formed with a plurality of second openings corresponding to the plurality of first openings.

The pressure receiving unit may further include a second spacer disposed between the second supporting plate and the second vibration plate.

The second vibration plate and the electrode plate may include a conductive material.

The second vibration plate may be configured to bend to a side of the second supporting plate in response to the gas inflowing through the first opening.

The plurality of pressure receiving units may respectively include: a third supporting plate; a conductive plate disposed on the third supporting plate; a third vibration plate disposed to be separated from the conductive plate; and a third spacer disposed between the conductive plate and the third vibration plate.

The third vibration plate may include first and second sub-vibration cells electrically separated from each other.

The third spacer may have a ring shape.

The third vibration plate may include a conductive material.

The third vibration plate may be configured to make contact with the conductive plate in response to the inflowing gas.

The plurality of pressure receiving units may respectively include: a fourth spacer; a fourth vibration plate supported by the fourth spacer; and a measuring element disposed at one side of the fourth vibration plate and configured to provide a measure of a transformation of the fourth vibration plate.

The fourth spacer and the fourth vibration plate may be integrally formed.

The measuring element may include a piezoresistive or a piezoelectric material.

According to the above-described display device, the contact by the external object such as the finger of the user is not necessary, such that disabled persons or patients that may not use their hands or tools may easily input the input signal to the display device by using their breath.

DETAILED DESCRIPTION OF THE EMBODIMENTS

Figure 1:
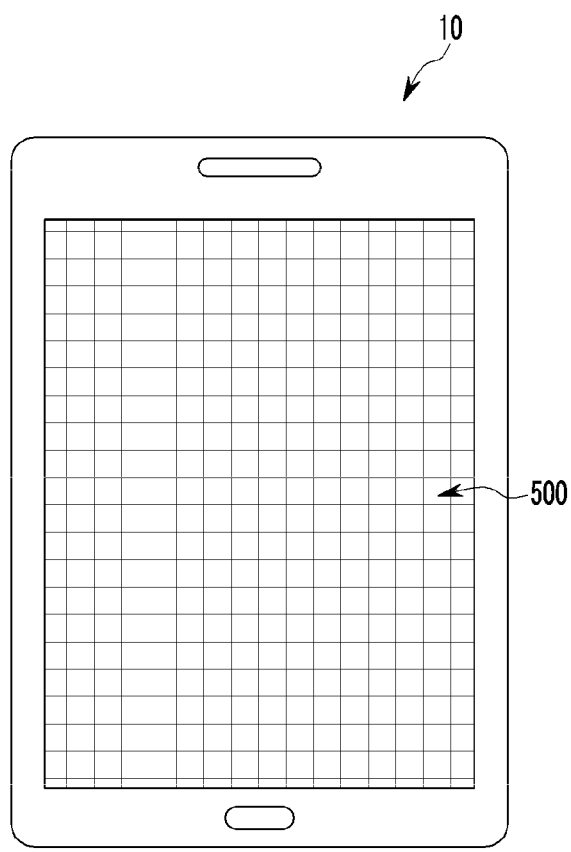
FIG. 1 is a top plan view of a display device according to an exemplary embodiment of the present invention.

Hereinafter, the present invention will be described more fully with reference to the accompanying drawings, in which exemplary embodiments of the invention are shown. As those skilled in the art would realize, the described embodiments may be modified in various different ways, all without departing from the spirit or scope of the present invention. The drawings and description are to be regarded as illustrative in nature and not restrictive. Like reference numerals designate like elements throughout the specification.

Further, since sizes and thicknesses of constituent members shown in the accompanying drawings are arbitrarily given for better understanding and ease of description, the present invention is not limited to the illustrated sizes and thicknesses.

In the drawings, the thickness of layers, films, panels, regions, etc., are exaggerated for clarity. That is, in the drawings, for better understanding and ease of description, the thicknesses of some layers and areas are exaggerated. It will be understood that when an element such as a layer, film, region, or substrate is referred to as being "on" another element, it may be directly on the other element, or intervening elements may also be present.

In addition, unless explicitly described to the contrary, the word "comprise" and variations such as "comprises" or "comprising" will be understood to imply the inclusion of stated elements but not the exclusion of any other elements. Further, in the specification, an upper part of a target portion indicates an upper part or a lower part of the target portion, and it does not mean that the target portion is always positioned at the upper side based on a gravity direction.

Now, a display device according to an exemplary embodiment will be described with reference to FIG. 1 to FIG. 3.

Figure 2:
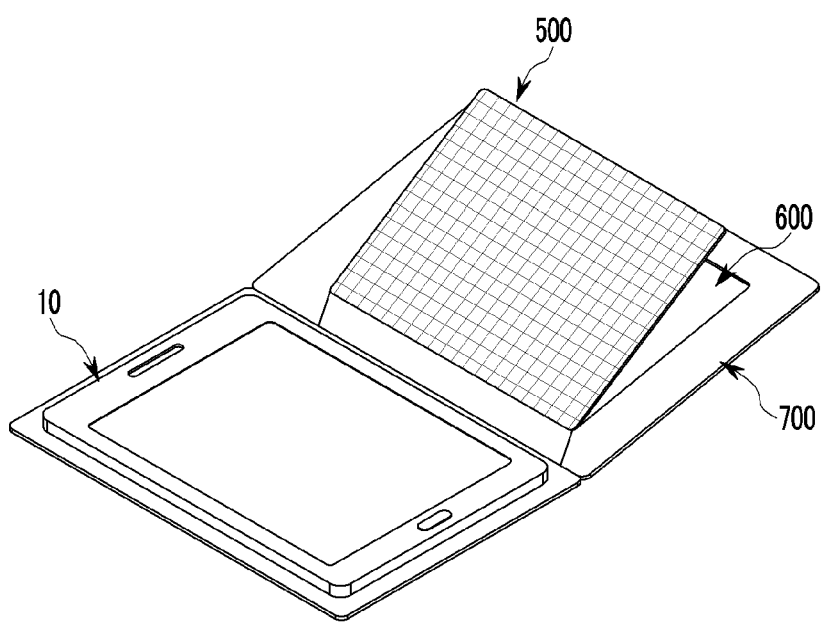
FIG. 2 is a view showing a state in which a second sensor is separated.
Figure 3:
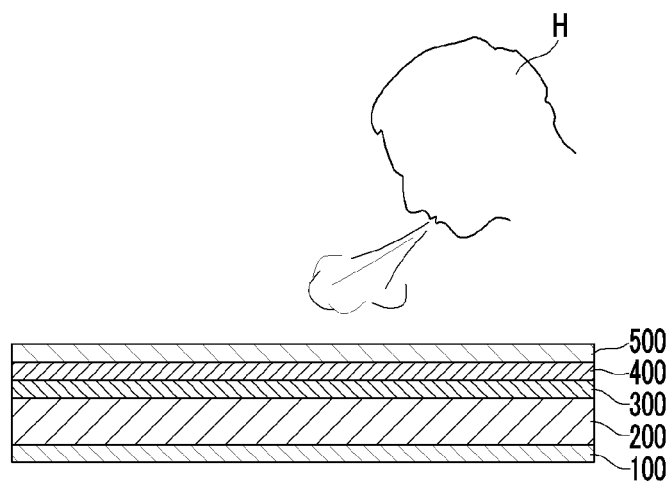
FIG. 3 is a cross-sectional view of a display device according to an exemplary embodiment of the present invention.

FIG. 1 is a top plan view of a display device according to an exemplary embodiment of the present invention, FIG. 2 is a view showing a state in which a second sensor is separated, and FIG. 3 is a cross-sectional view of a display device according to an exemplary embodiment of the present invention.

Referring to FIG. 1 to FIG. 3, a display device 10 according to an exemplary embodiment of the present invention includes a substrate 100, a display panel 200, and a sensor unit (300 and 500). According to the present exemplary embodiment, the sensor unit (300 and 500) may recognize a pressure caused by the breath, etc. of a user H as an input signal. That is, the user H may blow the breath without using a hand to input the input signal to the display device 10.

The substrate 100 may be made of an inorganic material such as glass, a metal material, or an organic material such as a resin. The substrate 100 may be either light-transmissive or light blocking, and may be flexible.

The display panel 200 is formed on the substrate 100. The display panel 200 emits light to display an image. In this case, the display panel may include a display panel of an organic light emitting diode display (OLED), or a display panel of a liquid crystal display (LCD), a plasma display device (PDP), a field effect display (FED), or an electrophoretic display.

Also, the sensor unit (300 and 500) recognizing the pressure caused by the breath as the input signal is positioned on the display panel 200. According to the present exemplary embodiment, the sensor unit (300 and 500) includes a first sensor 300 and a second sensor 500. The first sensor 300 is a touch sensor sensing a contact, and the second sensor 500 senses the pressure caused by a gas to transmit the contact signal to the first sensor 300. For example, if the user H blows the breath, the second sensor 500 senses the pressure caused by the breath as the input signal and transmits the input signal recognized by the second sensor 500 to the first sensor 300.

Figure 4:
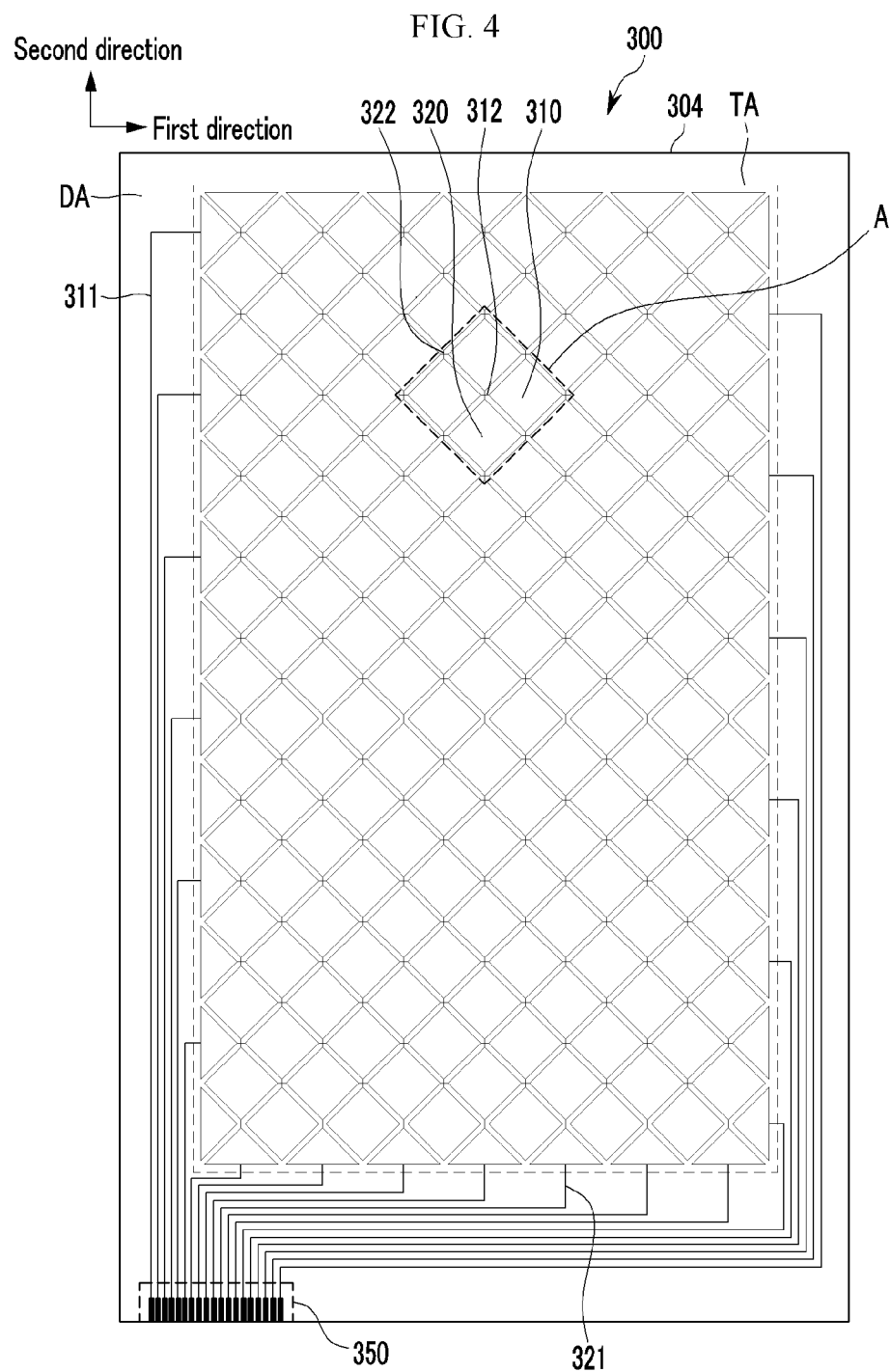
FIG. 4 is a top plan view of a first sensor of a display device according to an exemplary embodiment of the present invention.

Referring to FIG. 4, the first sensor 300 is positioned on the display panel 200 according to an exemplary embodiment of the present invention. In this case, the first sensor 300 includes a touch substrate 304, first and second touch electrodes 310 and 320, first and second connection parts 312 and 322, and first and second touch wires 311 and 321.

In this case, the first sensor 300 includes a touch sensing area TA that may sense the touch and a non-sensing area DA outside the touch sensing area TA. The non-sensing area DA is referred to as a dead space.

The touch substrate 304 may be a flexible film; however it is not limited thereto, and it may be a rigid substrate including glass, plastic, etc. The touch substrate 304 may be an isotropic substrate, and a phase retardation value thereof may be substantially 0 or very low. The touch substrate 404 may include at least one of an isotropic cyclic olefin polymer (COP) film, an unstretched polycarbonate (PC) film, and a triacetyl cellulose (TAC) film as the isotropic film.

In this case, the plurality of first and second touch electrodes 310 and 320 may be mainly positioned in the touch sensing area TA, and the first and second touch wires 311 and 321 may be positioned in the touch sensing area TA or the non-sensing area DA.

The first and second touch electrodes 310 and 320 may have transmittance of more than a predetermined value to transmit light from the underlying display panel. For example, the first and second touch electrodes 310 and 320 may include at least one transparent conductive material such as a metal nanowire, a conductive polymer such as PEDOT, a metal mesh, carbon nanotubes (CNT), indium tin oxide (ITO), indium zinc oxide (IZO), and a thin metal layer.

The first and second touch wires 311 and 321 may include the transparent conductive material included in the touch electrodes 310 and 320 and/or a low resistance material such as molybdenum (Mo), silver (Ag), titanium (Ti), copper (Cu), aluminum (Al), and molybdenum/aluminum/molybdenum (Mo/Al/Mo).

The first and second touch wires 311 and 321 may include a portion that is positioned with the same layer as the first and second touch electrodes 310 and 320, or not.

The first and second touch electrodes 310 and 320 form a touch sensor that may sense the contact by various methods. The touch sensor may be one of several types using various methods such as a resistive type, a capacitive type, an electromagnetic (EM) type, and an optical type.

In the present exemplary embodiment, the capacitive type of touch sensor will be described as an example. In detail, when the second sensor 500 of FIG. 8 to FIG. 11 is positioned on the first sensor 300, the first sensor 300 may be applied with the capacitive type of touch sensor.

The capacitive type of touch sensor may receive a sensing input signal from a touch driver (not shown) through one of the touch electrodes 310 and 320, and may output a sensing output signal that is changed depending on the contact of the external object.

When the touch electrodes 310 and 320 form a self-sensing capacitor with the external object, the touch electrode receives the sensing input signal and is charged with a predetermined amount of charges, and when there is a contact by the external object such as a finger, the amount of charges stored in the self-sensing capacitor is changed, and a sensing output signal that is different from the sensing input signal is output. Contact information such as a contact state or a contact position is known by the change of the sensing output signal.

When neighboring touch electrodes 310 and 320 form a mutual-sensing capacitor, one touch electrode receives the sensing input signal from the driver and the mutual-sensing capacitor is charged with a predetermined amount of charges. When there is a contact by the external object such as the finger, the stored amount of charges of the mutual-sensing capacitor is changed and the changed amount of charges is output as a sensing output signal through the touch electrodes 310 and 320. The contact information such as a contact state or a contact position is known by the sensing output signal.

The touch sensor forming the mutual-sensing capacitor will be described in the present exemplary embodiment as an example.

Referring to FIG. 4, the touch electrodes 310 and 320 of the touch sensor according to an exemplary embodiment may include a plurality of first touch electrodes 310 and a plurality of second touch electrodes 320. The first touch electrode 310 and the second touch electrode 320 are separated from each other.

The plurality of first touch electrodes 310 and the plurality of second touch electrodes 320 may be alternately dispersed and disposed so as to not overlap each other in the touch active area TA. The plurality of first touch electrodes 310 may be disposed along a column direction and a row direction, and the plurality of second touch electrodes 320 may also be disposed along a column direction and a row direction.

The first touch electrode 310 and the second touch electrode 320 may be disposed in the same layer; however, they are not limited thereto, and the first touch electrode 310 and the second touch electrode 320 may be positioned in different layers. When the first touch electrode 310 and the second touch electrode 320 are positioned in different layers, the first touch electrode 310 and the second touch electrode 320 may be positioned on different surfaces (e.g., upper surface and lower surface) of the touch substrate 304, and may be positioned in different layers on the same surface of the touch substrate 304.

According to an exemplary embodiment of the present invention, the plurality of first and second touch electrodes 310 and 320 are positioned on the upper surface of the touch substrate 304. That is, as shown in FIG. 4, the first and second touch electrodes 310 and 320 are formed on the same surface of the touch substrate 304.

Each of the first touch electrode 310 and the second touch electrode 320 may have a shape of a quadrangle, but they are not limited thereto, and they may have various forms, such as a form having a protrusion, in order to improve sensitivity of the touch detecting sensor.

The plurality of first touch electrodes 310 arranged in the same row or column may be connected with or separated from each other inside or outside the touch sensing area TA. Similarly, at least some of the plurality of second touch electrodes 320 arranged in the same column or row may be connected with or separated from each other inside or outside the touch sensing area TA.

For example, in a case in which the plurality of first touch electrodes 310 arranged in the same row, that is, a first direction, are connected with each other inside the touch sensing area TA as illustrated in FIG. 4, the plurality of second touch electrodes 320 arranged in the same column, that is, a second direction, may be connected with each other inside the touch sensing area TA. Here, the second direction, which is a direction perpendicular to the first direction, represents the same direction as the column direction.

More particularly, the plurality of first touch electrodes 310 positioned in each row may be connected with each other through a first connection part 312, and the plurality of second touch electrodes 320 positioned in each column may be connected with each other through a second connection part 322. That is, first touch electrodes 310 arranged in the same row may be connected together via the first connection part 312, and second touch electrodes 320 arranged in the same column may be connected together via the second connection part 322.

Figure 5:
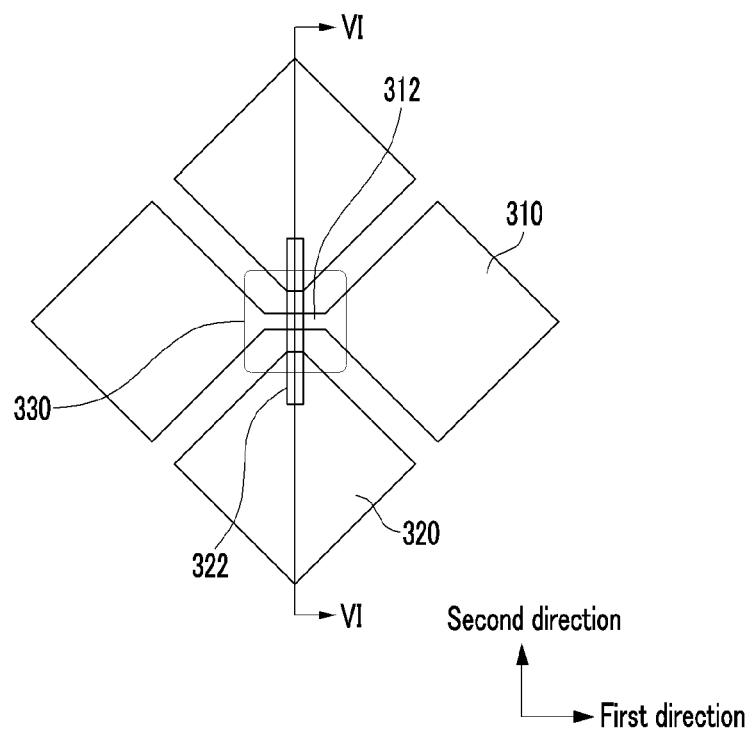
FIG. 5 is an enlarged view of a part of a first sensor in a region A of FIG. 4.
Figure 6:
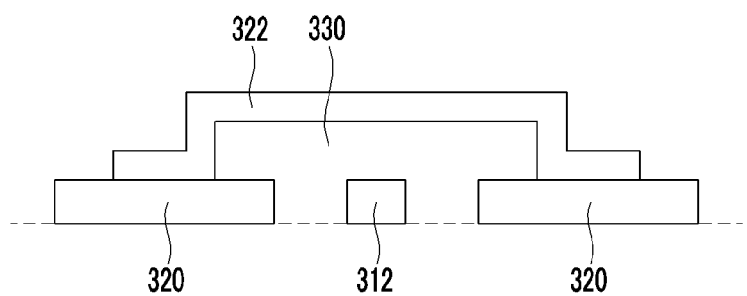
FIG. 6 is a cross-sectional view of the first sensor taken along a line VI-VI of FIG. 5.

Referring to FIG. 5 and FIG. 6, the first connection part 312 connecting the adjacent first touch electrodes 310 may be positioned in the same layer as that of the first touch electrode 310 and formed of the same material as that of the first touch electrode 310. That is, the first touch electrode 310 and the first connection part 312 may be integrated or integrally formed with each other, and may be simultaneously patterned.

The second connection part 322 connecting the adjacent second touch electrodes 320 may be positioned in a different layer from that of the second touch electrode 320. That is, the second touch electrode 320 and the first connection part 312 may be separated or separately formed from each other, and may be separately patterned. The second touch electrode 320 and the second connection part 322 may be connected with each other through direct contact.

An insulating layer 330 is positioned between the first connection part 312 and the second connection part 322 to insulate the first connection part 312 and the second connection part 322 from each other. The insulating layers 330 may be a plurality of separated island-shaped insulators disposed at every crossing portion of the first connection part 312 and the second connection part 322, as illustrated in FIG. 5 and FIG. 6. The insulating layer 330 may expose at least a part of the second touch electrode 320 so that the second connection part 322 is connectable with the second touch electrode 320. That is, the insulation layer 330 may cover only a portion of the second touch electrode 320.

According to another exemplary embodiment of the present invention, the insulating layer 330 is formed on the entire area on the touch substrate 304, and the insulating layer 330 positioned on the portion of the second touch electrode 320 may be removed for the connection of the second touch electrodes 320 in the adjacent column direction.

Differently from FIG. 5 and FIG. 6, a second connection part 322 connecting the adjacent second touch electrodes 320 may be positioned in the same layer as that of the first touch electrode 310 and integrated or integrally formed with the second touch electrode 320, and a first connection part 312 connecting adjacent first touch electrodes 310 may be positioned in a different layer from that of the first touch electrode 310.

Referring to FIG. 4, the first touch electrodes 310 connected with each other in each row may be connected with a touch driver (not shown) through first touch wires 311, and the second touch electrodes 320 connected with each other in each column may be connected with the touch driver through second touch wires 321. The first touch wires 311 and the second touch wires 321 may be positioned in the non-sensing area DA, or alternatively may be positioned in the touch sensing area TA.

End portions of the first touch wires 311 and the second touch wires 321 form a pad portion 350 in the non-sensing area DA.

The first touch wire 311 inputs the sensing input signal to the first touch electrode 310 or outputs the sensing output signal to the touch driver through the pad portion 350. The second touch wire 321 inputs the sensing input signal to the second touch electrode 320 or outputs the sensing output signal through the pad portion 350.

The touch driver controls the operation of the touch sensor. The touch driver may transmit the sensing input signal to the touch sensor and may receive a sensing output signal to be processed. The touch driver processes the sensing output signal to generate the touch information such as the touch and the touch position.

The touch driver may be directly mounted on the first sensor 300 as a type of at least one IC chip, may be mounted on a flexible printed circuit film (FPC) or a printed circuit board to be attached to the first sensor 300 as a tape carrier package (TCP) type, or may be mounted on a separate printed circuit board to be connected to the pad portion 350. Alternatively, the touch driver may be integrated with the first sensor 300.

Again referring to FIG. 3, a window 400 may be positioned on the first sensor 300. The window 400 may protect the touch sensor 300 and the display panel 200 from an external impact, moisture, and the like. In the present exemplary embodiment, the window 400 is positioned between the first sensor 300 and the second sensor 500; however, it is not limited thereto, and the window 400 may be positioned on the first sensor 300 or the second sensor 500, or the first sensor 300 and the second sensor 500 may be sequentially positioned on the window 400.

The window 400 may be made of an insulating material such as plastic or glass. The window 400 may be flexible or hard. The surface of the window 400 may be a touch surface that the external object may contact.

The window 400 may be adhered on the display panel 200 using an adhesive such as the OCA, OCR, and PSA.

According to the present exemplary embodiment, the second sensor 500 is positioned on the window 400. The second sensor 500 may recognize the breath of the user H as the input signal of the user H for the display device 10. In the first sensor 300 of the touch sensor, the contact of the external object, for example, the contact of the hand of the user H, is recognized as the input signal, and the second sensor 500 recognizes the breath of the user H as the input signal.

That is, the second sensor 500 may recognize that the gas such as the breath of the user H presses the upper surface of the second sensor 500. The second sensor 500 may obtain input information such as receiving an indication of the existence of the input signal of the user H, or receiving an indication of the position of the pressure caused by the gas.

In this case, the second sensor 500 may be disposed to be detachable. For example, the second sensor 500 may be disposed on the window 400 only when being used. When the second sensor 500 is not used, the second sensor 500 may be removed from the window 400. As shown in FIG. 2, the second sensor 500 may be coupled to be rotatable at one side of a protection cover 700 of the display device 10. Also, a protection window 600 protecting the second sensor 500 may be disposed in the protection cover 700.

According to the present exemplary embodiment, since the contact by the external object such as the finger of the user H is not necessary, patients or disabled persons who may not use their hand or a tool may easily input the input signal to the display device by using the breath. Also, without taking off gloves to apply the input signal to the touch sensor in cold weather, the input signal may be transmitted by the breath.

For example, referring to FIG. 7 to FIG. 9, if the user H applies the breath to the first sensing area A1 of first and second sensing areas A1 and A2, the shape of a first vibration plate 515 of the second sensor 500, which is described later, may be changed. In this case, if the first vibration plate 515 is bent downward, the change of the charging charge amount of the capacitive type first sensor 300 positioned under the second sensor 500 may be generated.

The shape change of the first vibration plate 515 causes the change of the charge amount of the mutual-sensing sensing capacitor formed by the touch electrodes 310 and 320 of the first sensor 300. In this case, the changed charge amount may be output as the sensing output signal through the touch electrodes 310 and 320.

In this case, the first vibration plate 515 corresponds to the finger of the user H contacting the first sensor 300.

Resultantly, the second sensor 500 has a function of receiving the breath of the user H and transmitting it to the first sensor 300. That is, the second sensor 500 translates the breath input of the user H into a touch input that is detectable by the first sensor 300.

Next, the second sensor 500 will be described in detail with reference to FIG. 7 to FIG. 9.

Figure 7:
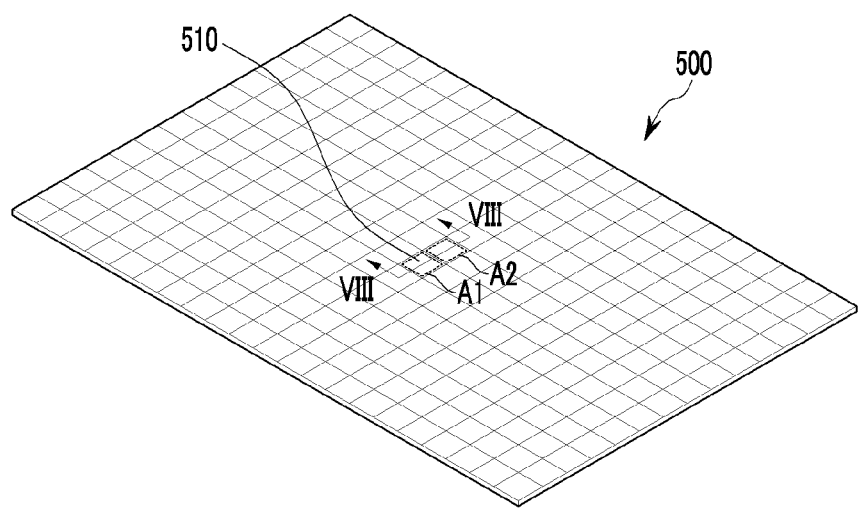
FIG. 7 is a schematically perspective view of a second sensor of a display device according to an exemplary embodiment of the present invention.

Referring to FIG. 7, the second sensor 500 includes a plurality of pressure receiving units 510 arranged in a lattice shape. The plurality of pressure receiving units 510 may be respectively disposed corresponding to the sensing area. For example, each pressure receiving unit 510 may be disposed one-by-one corresponding to the first and second sensing areas A1 and A2.

Figure 8:
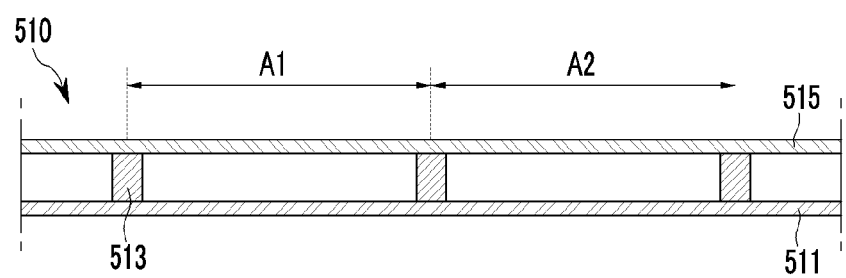
FIG. 8 is a cross-sectional view of the first sensor taken along a line VIII-VIII of FIG. 7.
Figure 9:
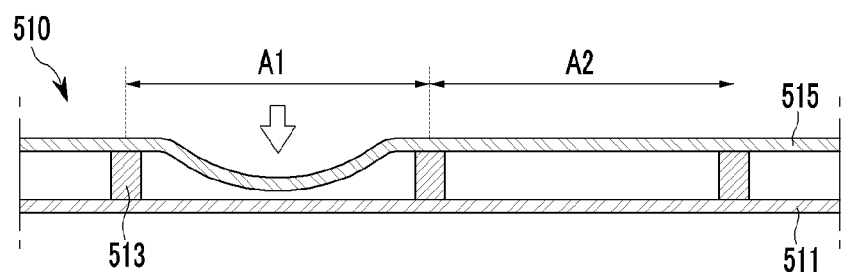
FIG. 9 is a view showing an operation state of the second sensor of FIG. 8.

Referring to FIG. 8 and FIG. 9, the pressure receiving unit 510 includes a first supporting plate 511, a first vibration plate 515, and a first spacer 513.

The first supporting plate 511 supports the first vibration plate 515 and the first spacer 513. The first supporting plate 511 may be made of an insulating material such as plastic or glass, and may be flexible or hard.

The first supporting plate 511 may be made of a transparent material so that user H can see the image emitted from the display panel 200 positioned at the lower side from the outside.

Also, the first spacer 513 supporting the first vibration plate 515 is disposed on the first supporting plate 511. The first spacer 513 separates the first vibration plate 515 and the first supporting plate 511 by a predetermined distance interval.

In this case, the first spacer 513 may be disposed corresponding to the boundary of the sensing areas adjacent to each other. For example, the first spacer 513 is positioned on the boundary of the first and second sensing areas A1 and A2. Resultantly, the first and second sensing areas A1 and A2 may be divided by the first spacer 513.

The first vibration plate 515 is disposed to be separated from the first supporting plate 511. The first vibration plate 515 is supported by the first spacer 513.

The first vibration plate 515 may be bent by the breath of the user H. In this case, the first vibration plate 515 is bent in the direction opposite to the direction from which the breath flows. That is, as shown in FIG. 9, the first vibration plate 515 may be bent and a portion thereof may move closer to the side of the first supporting plate 511.

According to the present exemplary embodiment, the first vibration plate 515 may be made with a thin film shape having elasticity. Accordingly, if the breath of the user H flows, the first vibration plate 515 is bent to the side of the first supporting plate 511, and if the breath disappears, the first vibration plate 515 is restored to an original position. If the first vibration plate 515 is bent, the first vibration plate 515 may be contacted with or may move to a position close to the first supporting plate 511.

On the other hand, the first vibration plate 515 may be made of a material that may be chargeable. If the first vibration plate 515 is bent to the side of the first supporting plate 511 such that the first vibration plate 515 is contacted with or moves close to the first supporting plate 511, the change of the charging charge amount of the capacitive type of first sensor 300 may be generated.

In this case, the first vibration plate 515 may include a metal powder or a polymer resin. However, the chargeable material is not limited thereto, and various disclosed chargeable materials may be used.

Also, the first vibration plate 515 may be made of a transparent material so that the user can see the image emitted from the display panel 200 positioned at the lower side from the outside.

In an exemplary embodiment of the present invention, the first vibration plate 515 respectively disposed in the plurality of pressure receiving units 510 may be integrally formed. As shown in FIG. 8, the first vibration plate 515 may be formed of one thin film shape throughout the entire second sensor 500. However, the first vibration plate 515 may be divided into vibration plates of each pressure receiving unit 510 by the first spacer 513 disposed at the boundary of the sensing area. For example, as shown in FIG. 8, the first vibration plate 515 disposed between the first spacers 513 facing each other may be divided into the pressure receiving unit 510 of the first sensing area A1 and the pressure receiving unit 510 of the second sensing area A2.

Hereafter, the first exemplary variation of the second sensor applied to the display device according to an exemplary embodiment will be described with reference to FIG. 10 and FIG. 11. However, the detailed description for the same configurations as the above-described second sensor is omitted from the following description of the first exemplary variation.

Figure 10:
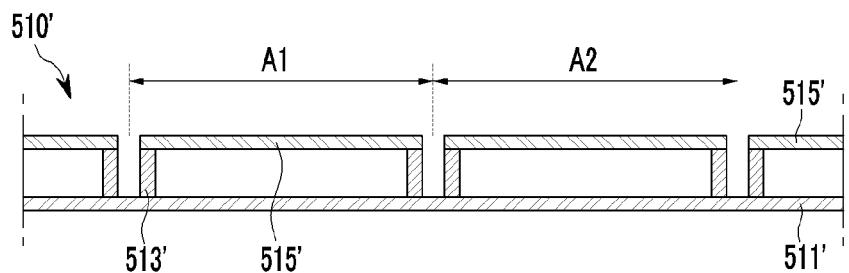
FIG. 10 is a cross-sectional view of a second sensor according to a first exemplary variation of an exemplary embodiment of the present invention.
Figure 11:
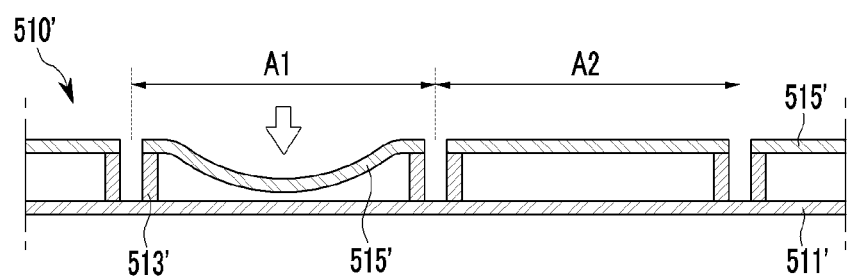
FIG. 11 is a view showing an operation state of the second sensor of FIG. 10.

FIG. 10 is a cross-sectional view of a second sensor according to a first exemplary variation of an exemplary embodiment of the present invention, and FIG. 11 is a view showing an operation state of the second sensor of FIG. 10.

Referring to FIG. 10, first vibration plates 515' respectively disposed in a plurality of pressure receiving units 510' may be separated from each other. For example, the first vibration plates 515' may be respectively disposed to be separated from each other in the first and second sensing areas A1 and A2.

As described above, the first vibration plates 515' are disposed to be separable and separated from the first supporting plate 511' by the first spacers 513'. Thus, when a first vibration plate 515' is damaged during usage, only the damaged first vibration plate 515' may need to be replaced. That is, when the first vibration plate 515 of FIG. 8 is damaged, the entire first vibration plate 515 must be replaced; however, in the case of the first vibration plate 515' of FIG. 10, the damaged part may be separated and replaced.

Next, a second exemplary variation of the second sensor applied to the display device according to an exemplary embodiment will be described with reference to FIG. 12 and FIG. 13. However, the detailed description for the same configurations as the above-described second sensor is omitted from the following description of the second exemplary variation.

Figure 12:
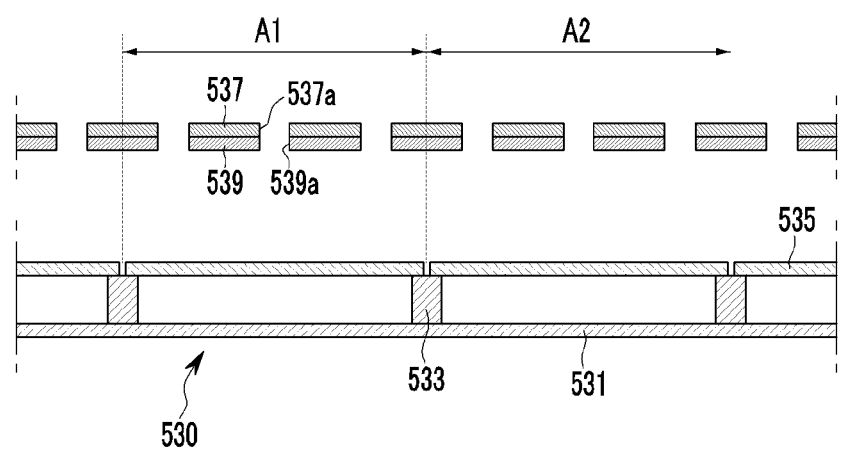
FIG. 12 is a cross-sectional view of a second sensor according to a second exemplary variation of an exemplary embodiment of the present invention.
Figure 13:
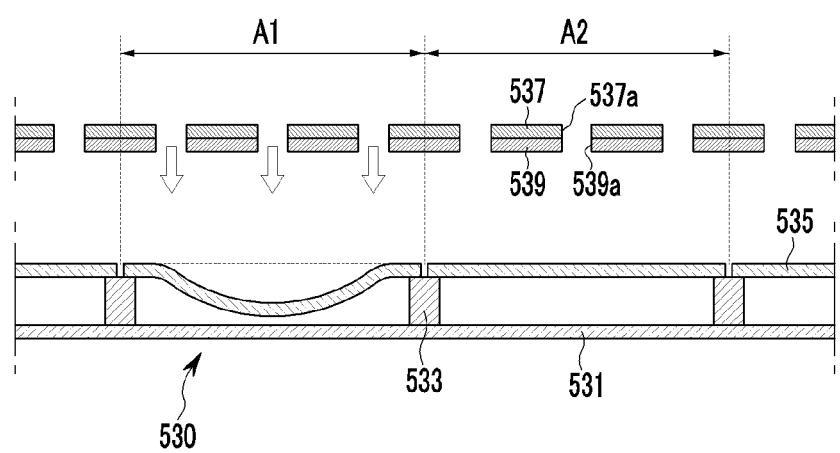
FIG. 13 is a view showing an operation state of the second sensor of FIG. 12.

FIG. 12 is a cross-sectional view of a second sensor according to a second exemplary variation of an exemplary embodiment of the present invention, and FIG. 13 is a view showing an operation state of the second sensor of FIG. 12.

Referring to FIG. 12 and FIG. 13, a pressure receiving unit 530 includes a second supporting plate 531, a second vibration plate 535, an electrode plate 537, a second spacer 533, and a protection plate 539.

The second supporting plate 531 supports the second vibration plate 535 and the second spacer 533. The second supporting plate 531 may be made of an insulating material such as plastic or glass, and may be flexible or hard.

The second supporting plate 531 may be made of a transparent material so that the user can see the image emitted from the display panel 200 positioned at the lower side from the outside.

Also, the second spacer 533 supporting the second vibration plate 535 is disposed on the second supporting plate 531. The second spacer 533 separates the second vibration plate 535 and the second supporting plate 531 by a predetermined distance interval.

In this case, second spacers 533 may be disposed corresponding to the boundary of the sensing areas adjacent to each other. For example, the second spacer 533 is positioned on the boundary of the first and second sensing areas A1 and A2. Resultantly, the first and second sensing areas A1 and A2 may be divided by the second spacer 533.

The second vibration plate 535 is disposed to be separated from the second supporting plate 531. The second vibration plate 535 is supported by the second spacer 533.

If the breath of the user H is applied to the second vibration plate 535, the shape of the second vibration plate 535 may be transformed. Here, the second vibration plate 535 may be bent in and move closer to the side of the second supporting plate 531.

According to the present exemplary embodiment, the second vibration plate 535 may be made of a thin film shape having elasticity. Accordingly, if the breath of the user H flows, the second vibration plate 535 is bent to the side of the second supporting plate 531 due to the gas pressure from the breath, and if the breath disappears, the second vibration plate 535 is restored to the original position. If the second vibration plate 535 is bent, the second vibration plate 535 may be contacted with or may move to the position close to the second supporting plate 531.

The second vibration plate 535 is made of a conductive material. If power is supplied, a predetermined charge may be charged between the electrode plate 537 and the second vibration plate 535 facing each other. After the predetermined charge is charged, if the shape of the second vibration plate 535 is transformed by the breath of the user H, the change of the charge amount charged between the electrode plate 537 and the second vibration plate 535 is generated.

Also, the second vibration plate 535 may be made of a transparent material so that the user can see the image emitted from the display panel 200 positioned at the lower side from the outside.

The electrode plate 537 separated from the second vibration plate 535 is disposed on the second vibration plate 535. The electrode plate 537 is made of a conductive material such that the predetermined charge is charged along with the above-described second vibration plate 535.

The electrode plate 537 may be made of a transparent material so that the user can see the image emitted from the display panel 200 positioned at the lower side from the outside.

A plurality of first openings 537a are formed in the electrode plate 537. The breath of the user H may be transmitted to the second vibration plate 535 through the plurality of first openings 537a. In this case, the breath inflowing through the first openings 537a formed in the first sensing area A1 may transform the shape of the second vibration plate 535 and may be discharged through the first openings 537a formed in the adjacent second sensing area A2.

Also, the protection plate 539 supporting the electrode plate 537 is disposed under the electrode plate 537. The protection plate 539 supports the electrode plate 537 to prevent the shape of the electrode plate 537 from being transformed by the breath of the user H. In the present exemplary variation, the protection plate 539 is disposed under the electrode plate 537. However, the protection plate 539 may be disposed on the electrode plate 537.

In the protection plate 539, second openings 539a are formed at the positions corresponding to the plurality of first openings 537a of the electrode plate 537. Like the first openings 537a, the breath of the user H may be transmitted to the second vibration plate 535 through the plurality of second openings 539a of the protection plate 539.

Now, an operation principle of the second sensor of the second exemplary variation will be described. The second sensor of the second exemplary variation corresponds to the operation principle of a condenser microphone in which a predetermined charge is charged between two electrodes. If the power is supplied to the electrode plate 537 and the second vibration plate 535 of the pressure receiving unit 530, the predetermined charge is charged between the electrode plate 537 and the second vibration plate 535.

Next, if the breath of the user H flows inside through the first and second openings 537a and 539a, the shape of the second vibration plate 535 is transformed. For example, the second vibration plate 535 may be bent to the side of the second supporting plate 531.

If the shape of the second vibration plate 535 is transformed, the distance between the electrode plate 537 and the second vibration plate 535 is changed such that the change of the charge amount between the electrode plate 537 and the second vibration plate 535 is generated.

For example, as shown in FIG. 13, when the user H applies the breath to the first sensing area A1 of the first and second sensing areas A1 and A2, the shape of the second vibration plate 535 of the first sensing area A1 may be changed. As described above, it is recognized that the charge amount charged in the first sensing area A1 is changed by the second vibration plate 535, and it is recognized that the input signal is transmitted to the first sensing area A1.

Next, a third exemplary variation of the second sensor applied to the display device according to an exemplary embodiment will be described with reference to FIG. 14 to FIG. 17. However, the detailed description for the same configuration as the above-described second sensor is omitted from the following description of the third exemplary variation.

Figure 14:
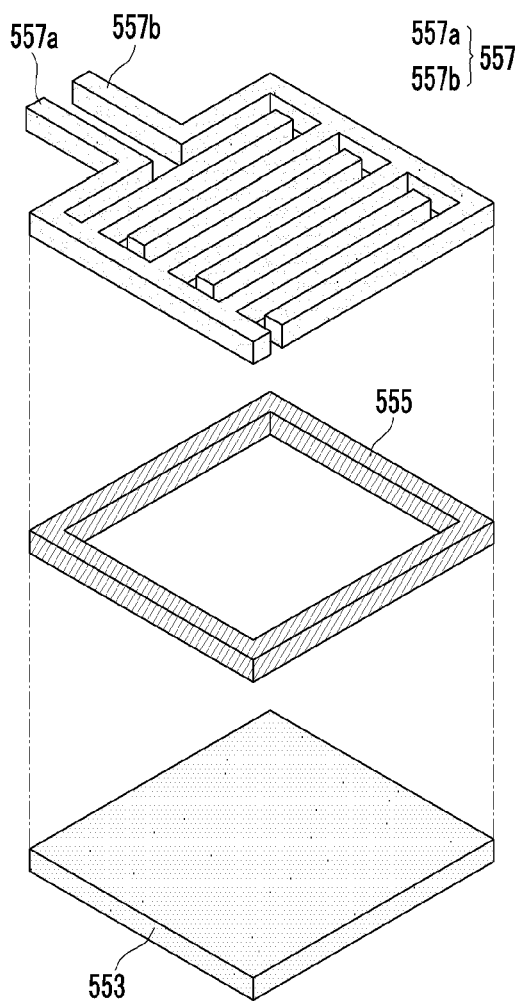
FIG. 14 is a schematically exploded perspective view of a second sensor according to a third exemplary variation of an exemplary embodiment of the present invention.
Figure 15:
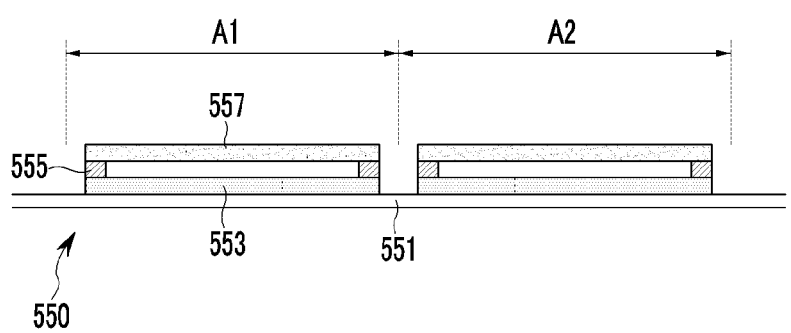
FIG. 15 is a cross-sectional view of a second sensor according to a third exemplary variation of an exemplary embodiment of the present invention.
Figure 16:
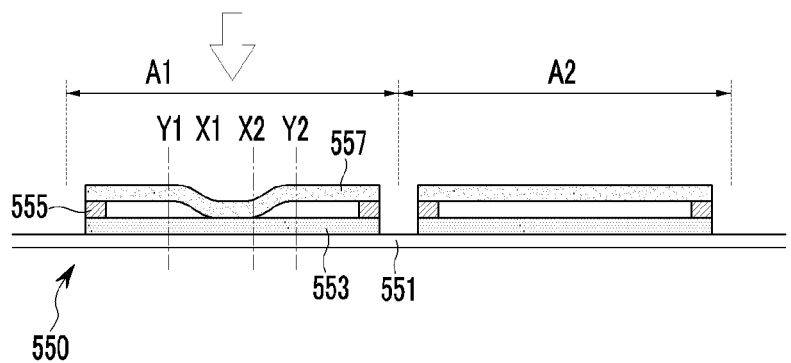
FIG. 16 and FIG. 17 are views showing an operation state of the second sensor of FIG. 15.
Figure 17:
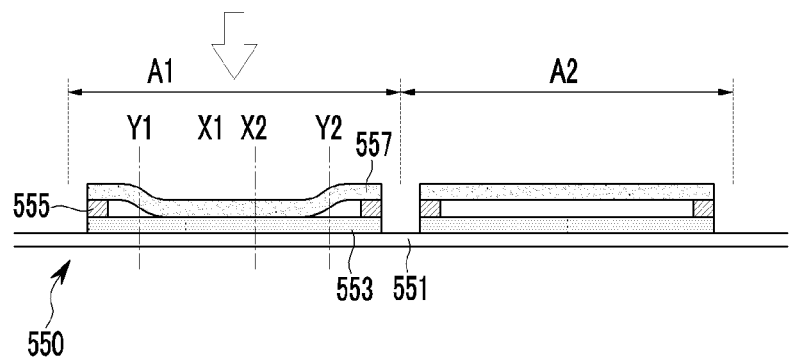

FIG. 14 is a schematically exploded perspective view of a second sensor according to a third exemplary variation of an exemplary embodiment of the present invention, FIG. 15 is a cross-sectional view of a second sensor according to a third exemplary variation of an exemplary embodiment of the present invention, and FIG. 16 and FIG. 17 are views showing an operation state of the second sensor of FIG. 15.

Referring to FIG. 14 and FIG. 15, each pressure receiving unit 550 includes a third supporting plate 551, a conductive plate 553, a third spacer 555, and a third vibration plate 557.

The third supporting plate 551 supports the conductive plate 553, the third spacer 555, and the third vibration plate 557. The third supporting plate 551 may be made of an insulating material such as plastic or glass, and may be flexible or hard.

The third supporting plate 551 may be made of a transparent material so that the user can see the image emitted from the display panel 200 positioned at the lower side from the outside.

Also, the conductive plate 553 is disposed on the third supporting plate 551. The conductive plate 553 is contacted with the third vibration plate 557 when it is bent by the breath of the user H. The conductive plate 553 is made of a conductive material, and the resistance of the third vibration plate 557 may be controlled depending on the contact area of the third vibration plate 557.

For example, referring to FIG. 16 and FIG. 17, compared with the case in which the third vibration plate 557 is contacted with the region X1-X2 of the conductive plate 553, when the third vibration plate 557 is contacted with the region Y1-Y2 of the conductive plate 553, the resistance of the third vibration plate 557 is decreased. That is, the contact area of the third vibration plate 557 and the conductive plate 553 is increased, so the resistance of the third vibration plate 557 may be decreased.

The third spacer 555 with a ring shape is disposed on the conductive plate 553. The third spacer 555 may maintain the predetermined distance interval between the conductive plate 553 and the third vibration plate 557.

The third spacer 555 may be disposed corresponding to the boundary of the sensing areas adjacent to each other. For example, the third spacer 555 is positioned at the boundary of the first and second sensing areas A1 and A2. Resultantly, the first and second sensing areas A1 and A2 may be divided by the third spacer 555.

The third vibration plate 557 is separated from the conductive plate 553, made of a conductive material, and disposed on the third spacer 555. As shown in FIG. 14, the third vibration plate 557 is formed of first and second sub-vibration cells 557a and 557b that are electrically separated.

In this case, the first and second sub-vibration cells 557a and 557b may be disposed to form one plane.

If the breath of the user H is applied to the first and second sub-vibration cells 557a and 557b, the shape of the first and second sub-vibration cells 557a and 557b may be changed. Here, the first and second sub-vibration cells 557a and 557b may be bent to the side of the conductive plate 553.

According to the present exemplary embodiment, the first and second sub-vibration cells 557a and 557b may be made of the thin film having elasticity. Accordingly, when the breath of the user H flows in, the first and second sub-vibration cells 557a and 557b are bent to the side of the conductive plate 553, and if the breath disappears, the first and second sub-vibration cells 557a and 557b are restored to the original position.

In this case, when the breath of the user H is strong, the contact area of the first and second sub-vibration cells 557a and 557b and the conductive plate 553 is increased. If the breath of the user H is increased, as shown in FIG. 16 and FIG. 17, the contact region of the first and second sub-vibration cells 557a and 557b and the conductive plate 553 is changed from the region X1-X2 to the region Y1-Y2, thereby the contact area is increased.

Next, the operation principle of the second sensor of the third exemplary variation will be described. The second sensor of the third exemplary variation corresponds to the operation principle of a force sensing resistor (FSR) sensor.

If the power is applied to the first and second sub-vibration cells 557a and 557b, the predetermined resistance is maintained by the first and second sub-vibration cells 557a and 557b.

Next, if the breath of the user H is transmitted to the first and second sub-vibration cells 557a and 557b, the shape of the first and second sub-vibration cells 557a and 557b is transformed. For example, the first and second sub-vibration cells 557a and 557b may be bent to the side of the conductive plate 553.

If the breath of the user H is increased, as shown in FIG. 16 and FIG. 17, the contact region of the first and second sub-vibrations cell 557a and 557b and the conductive plate 553 is changed from the region X1-X2 into the region Y1-Y2 such that the contact area is increased.

As described above, if the contact area of the first and second sub-vibration cells 557a and 557b and the conductive plate 553 is increased, the resistance of the first and second sub-vibration cells 557a and 557b is decreased.

That is, as it is recognized that the resistance of the first and second sub-vibration cells 557a and 557b is changed, it is recognized that the input signal is transmitted to the first sensing area A1 of the first and second sensing area A1 and A2. Also, the breath intensity of the user H may be measured depending on the change degree of the resistance of the first and second sub-vibration cell 557a and 557b.

Next, a fourth exemplary variation of the second sensor applied to the display device according to an exemplary embodiment will be described with reference to FIG. 18 and FIG. 19. When however, the detailed description for the same configuration as the above-described second sensor is omitted from the following description of the fourth exemplary variation.

Figure 18:
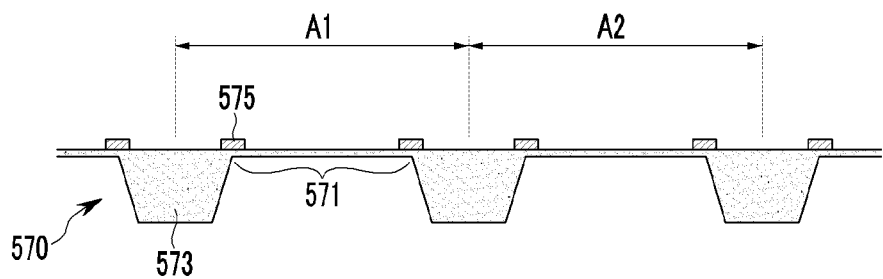
FIG. 18 is a cross-sectional view of a second sensor according to a fourth exemplary variation of an exemplary embodiment of the present invention.
Figure 19:
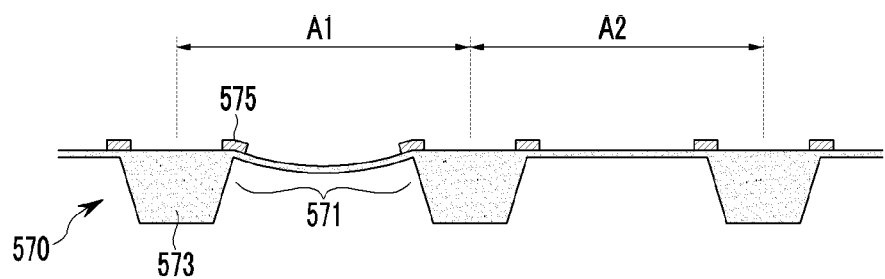
FIG. 19 is a view showing an operation state of the second sensor of FIG. 18.

FIG. 18 is a cross-sectional view of a second sensor according to a fourth exemplary variation of an exemplary embodiment of the present invention, and FIG. 19 is a view showing an operation state of the second sensor of FIG. 18.

Referring to FIG. 18 and FIG. 19, each pressure receiving unit 570 includes a fourth spacer 573, a fourth vibration plate 571, and a measuring element 575.

The fourth spacer 573 supports the fourth vibration plate 571. The fourth spacer 573 may be disposed corresponding to the boundary of the sensing areas adjacent to each other. For example, the fourth spacer 573 may be positioned at the boundary of the first and second sensing areas A1 and A2. Resultantly, the first and second sensing areas A1 and A2 may be divided by the fourth spacer 573.

The fourth vibration plate 571 is disposed on the adjacent fourth spacers 573. According to the present exemplary variation, the fourth vibration plate 571 may be made with the thin film shape having elasticity. Accordingly, if the breath of the user H inflows, the fourth vibration plate 571 is bent to the side of the first sensor 300, and if the breath disappears, the fourth vibration plate 571 is restored to the original position.

In this case, the fourth spacer 573 and the fourth vibration plate 571 may be integrally formed. The fourth spacer 573 and the fourth vibration plate 571 may be formed by a photolithography process using a half-tone mask.

According to the present exemplary variation, a plurality of measuring elements 575 may be disposed on the fourth vibration plate 571. The measuring element 575 measures the elastic transformation of the fourth vibration plate 571. For example, as the fourth vibration plate 571 is bent to the side of the first sensor 300 by the inflow of the breath of the user H, the elastic transformation of the fourth vibration plate 571 may be measured.

In this case, the measuring element 575 may be made of a piezoresistive or a piezoelectric material. If the measuring element 575 is made of the piezoresistive material, its resistance changes when the shape of the fourth vibration plate 571 is transformed. On the other hand, if the measuring element 575 is made of the piezoelectric material, the voltage value of the measuring element 575 changes when the shape of the fourth vibration plate 571 is transformed. As described above, if it is determined that the resistance or the voltage value of the measuring element 575 is changed, it may be recognized that the input signal is transmitted to the first sensing area A1. Also, the breath intensity of the user H may be measured depending on the change degree of the resistance or the voltage value of the measuring element 575.

In the display device according to an exemplary embodiment of the present invention, the separate second sensor 500 is provided as well as the first sensor 300 of the touch sensor, thereby recognizing the breath of the user as the input signal. According to the present exemplary embodiment, the contact by the external object such as the finger of the user H is not necessary, and the input signal may be easily input to the display device by using the breath of the user (e.g., a disabled person or patient) who may not use their hands or tools. Also, without taking off gloves to apply the input signal to the touch sensor in cold weather, the input signal may be transmitted by the breath.

While this invention has been described in connection with what is presently considered to be practical exemplary embodiments, it is to be understood that the invention is not limited to the disclosed embodiments. On the contrary, this invention is intended to cover various modifications and equivalent arrangements included within the spirit and scope of the appended claims.

| <Description of symbols> | |
|---|---|
| 10 display device | 100 substrate |
| 200 display panel | 300 first sensor |
| 400 window | 500 second sensor |
| H user | |

What is claimed is:

1. A display device comprising:
a display panel configured to display an image;
a pressure sensor configured to produce an input in response to pressure caused by a gas blown toward the display panel; and
a touch sensor positioned between the display panel and the pressure sensor and configured to provide a signal according to the input.

2. A display device comprising:
a display panel configured to display an image;
a first sensor positioned on the display panel and configured to sense a touch input; and
a second sensor positioned on the first sensor and configured to produce the touch input in response to pressure caused by a gas, wherein the first sensor is positioned between the display panel and the second sensor.

3. The display device of claim 2, wherein
the second sensor is configured to rotate relative to at least one of the first sensor and the display panel.

4. The display device of claim 2, further comprising
a window disposed between the first sensor and the second sensor.

5. The display device of claim 2, wherein
the second sensor includes a plurality of pressure receiving units.

6. The display device of claim 5, wherein
the plurality of pressure receiving units is arranged in a lattice shape.

7. The display device of claim 5, wherein
each of the plurality of pressure receiving units includes:
a supporting plate;
a vibration plate disposed to be separated from the supporting plate; and
a spacer disposed between the supporting plate and the vibration plate.

8. The display device of claim 7, wherein
the supporting plate and the vibration plate are made of a transparent material.

9. The display device of claim 7, wherein
the vibration plate is formed of one thin film shape throughout the second sensor.

10. The display device of claim 7, wherein
the vibration plate includes a plurality of first vibration plates, and
each of the plurality of first vibration plates disposed in each of the plurality of pressure receiving units are separated from each other.

11. The display device of claim 7, wherein
the vibration plate is configured to bend to a side of the supporting plate in response to an inflowing gas.

12. The display device of claim 7, wherein
the vibration plate is made of a chargeable material.

13. The display device of claim 5, wherein
each of the plurality of pressure receiving units includes:
a supporting plate;
an electrode plate disposed to be separated from the supporting plate and formed with a plurality of first openings; and
a vibration plate disposed between the supporting plate and the electrode plate and separated from the supporting plate and the electrode plate.

14. The display device of claim 13, wherein
the supporting plate, the electrode plate, and the vibration plate are made of a transparent material.

15. The display device of claim 13, wherein
each of the plurality of pressure receiving units further includes a protection plate coupled to at least one of an upper surface and a lower surface of the electrode plate, and
the protection plate is formed with a plurality of second openings corresponding to the plurality of first openings.

16. The display device of claim 13, wherein
each of the plurality of pressure receiving units further includes a spacer disposed between the supporting plate and the vibration plate.

17. The display device of claim 13, wherein
the vibration plate and the electrode plate include a conductive material.

18. The display device of claim 13, wherein
the vibration plate is configured to bend to a side of the supporting plate in response to the gas inflowing through the first opening.

19. The display device of claim 5, wherein
each of the plurality of pressure receiving units includes:
a supporting plate;
a conductive plate disposed on the supporting plate;
a vibration plate disposed to be separated from the conductive plate; and
a spacer disposed between the conductive plate and the vibration plate.

20. The display device of claim 19, wherein
the vibration plate includes first and second sub-vibration cells electrically separated from each other.

21. The display device of claim 19, wherein
the spacer has a ring shape.

22. The display device of claim 19, wherein
the vibration plate includes a conductive material.

23. The display device of claim 19, wherein
the vibration plate is configured to make contact with the conductive plate in response to the inflowing gas.

24. The display device of claim 5, wherein
each of the plurality of pressure receiving units includes:
a spacer;
a vibration plate supported by the spacer; and
a measuring element disposed at one side of the vibration plate and configured to provide a measure of a transformation of the vibration plate.

25. The display device of claim 24, wherein
the spacer and the vibration plate are integrally formed.

26. The display device of claim 24, wherein
the measuring element includes a piezoresistive or a piezoelectric material.

* * * * *